(12) United States Patent
Zang et al.

(10) Patent No.: US 8,743,733 B2
(45) Date of Patent: Jun. 3, 2014

(54) SWITCHING FRAME AND ROUTER CLUSTER

(75) Inventors: Dajun Zang, Shenzhen (CN); Lu Yang, Shenzhen (CN); Wenhua Du, Shenzhen (VN); Dongcheng Yang, Shenzhen (CN); Lingqiang Fan, Shenzhen (CN); Gang Gai, Shenzhen (CN); Da Zhou, Shenzhen (CN); Zhengjie Pu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 457 days.

(21) Appl. No.: 12/691,341

(22) Filed: Jan. 21, 2010

(65) Prior Publication Data

US 2010/0118867 A1 May 13, 2010

Related U.S. Application Data

(63) Continuation of application No. PCT/CN2008/071613, filed on Jul. 11, 2008.

(30) Foreign Application Priority Data

Jul. 27, 2007 (CN) .......................... 2007 1 0128960

(51) Int. Cl.
*H04L 12/28* (2006.01)
(52) U.S. Cl.
USPC ......................................................... 370/254
(58) Field of Classification Search
USPC ......................................................... 370/254
See application file for complete search history.

(56) References Cited

U.S. PATENT DOCUMENTS 3,842,214 A * 10/1974 Altenburger et al. ........ 340/2.71
5,321,813 A * 6/1994 McMillen et al. ............ 714/798
(Continued)

FOREIGN PATENT DOCUMENTS

| CN | 1983841 | 6/2007 |
|---|---|---|
| CN | 1983841 A | 6/2007 |
| DE | 4228694 | 3/1994 |

OTHER PUBLICATIONS

PCT International Preliminary Report on Patentability enclosing an English translation of the Written Opinion of the International Searching Authority for International application No. PCT/CN2008/071613, mailed Oct. 30, 2008, 4 pgs.
European Patent Office Communication for application No. 08783693.8, enclosing the extended European search report, pursuant to Rule 62 EPC, the supplementary European search report and the European search opinion, dated Jun. 25, 2010, 9 pgs.

(Continued)

*Primary Examiner* — Mark Rinehart
*Assistant Examiner* — Christopher R Crompton
(74) *Attorney, Agent, or Firm* — Brinks Gilson & Lione (57) ABSTRACT

A switching chassis includes more than one cascade unit and more than one switching unit, where: the cascade units have cascade interfaces to connect line processing chassis; the switching units have switching ports to connect the cascade interfaces; and any cascade interface of any cascade unit is connected to one switching port of any switching unit. A router cluster with the above switching chassis includes switching chassis and line processing chassis interconnected via optical fibers, where: any optical interface of any line processing chassis is connected to one cascade interface of any cascade unit; and any cascade interface of any cascade unit is connected to one switching port of any switching unit. With the present invention, the capacity of a router cluster can be expanded without the need to replace any component of the router cluster so that the expansion cost is lower.

9 Claims, 7 Drawing Sheets

(56) References Cited

U.S. PATENT DOCUMENTS

| | | | | |
|---|---|---|---|---|
| 5,325,090 A | * | 6/1994 | Goeldner | 340/2.22 |
| 5,481,073 A | * | 1/1996 | Singer et al. | 200/1 R |
| 5,878,177 A | * | 3/1999 | Karasan et al. | 385/17 |
| 6,710,623 B1 | * | 3/2004 | Jones et al. | 326/38 |
| 7,110,394 B1 | * | 9/2006 | Chamdani et al. | 370/355 |
| 7,899,334 B2 | * | 3/2011 | Zhong et al. | 398/157 |
| 2002/0093950 A1 | * | 7/2002 | Li | 370/360 |
| 2002/0186703 A1 | * | 12/2002 | West et al. | 370/413 |
| 2007/0200594 A1 | * | 8/2007 | Levi et al. | 326/38 |
| 2008/0166087 A1 | * | 7/2008 | Strasser et al. | 385/17 |

OTHER PUBLICATIONS

First Chinese Office Action issued by the State Intellectual Property Office of the PRC for application No. 200710128960.6, mailed Mar. 31, 2010, 5 pgs., Partial English translation attached.

Kang, Moo-Kyung et al, "Switch Expansion Architecture Using Local Switching Network", 2000 IEEE International Conference on Communications, New Orleans, LA, Jun. 18-21, 2000 and NewYork, NY; IEEE, US. vol. 3, Jun. 18, 2000, pp. 1426-1429, XP-001208648.

European Patent Office Communication for application No. 08783693.8, enclosing rejections, dated Nov. 15, 2011.

* cited by examiner

SWITCHING FRAME AND ROUTER CLUSTER

CROSS-REFERENCE TO RELATED APPLICATIONS

This application is a continuation of International Application No. PCT/CN2008/071613, filed on Jul. 11, 2008, which claims priority to Chinese Patent Application No. 200710128960.6, filed on Jul. 27, 2007, both of which are hereby incorporated by reference in their entireties.

FIELD OF THE INVENTION

The present invention relates to a switching chassis, and in particular, to a multi-plane switching chassis, applicable to expansion of a router cluster without replacing the switching chassis; the present invention also relates to a router cluster, and in particular, to a router cluster that has the above switching chassis and can be expanded without replacing the switching chassis.

BACKGROUND OF THE INVENTION

With the fast development of broadband networks and particularly the emergence of new services based on the broadband networks, the bandwidth required on a network in the future will increase sharply. Applications of Internet Protocol (IP) telephony, the 3rd Generation (3G) services, video conference, Video on Demand (VoD) and many emerging Point to Point (P2P) services are rapidly consuming the remaining bandwidths in the bearer network.

Clustering is a most effective technology that solves the issues of scalability. Introduction of clustering into router structuring intends to connect two or more common core routers in such a way that the core routers can collaborate and perform parallel processing so that the capacity of a system is expanded smoothly. To the outside, the clustered routers are one logical router. Parallel Packet Switching (PPS) cascades multiple independent switch fabrics to create a multi-stage multi-plane switching matrix so as to break the restrictions in switching capacity, power consumption and heat dissipation in the case of a single switching chassis and implement a larger-capacity routing and switching system.

At present, when routers and other communication devices are expanded through inter-chassis cascade, a central switching chassis is generally placed to realize data switching between line processing chassis. The central switching chassis is generally implemented in a multi-plane switching structure.

Figure 1:
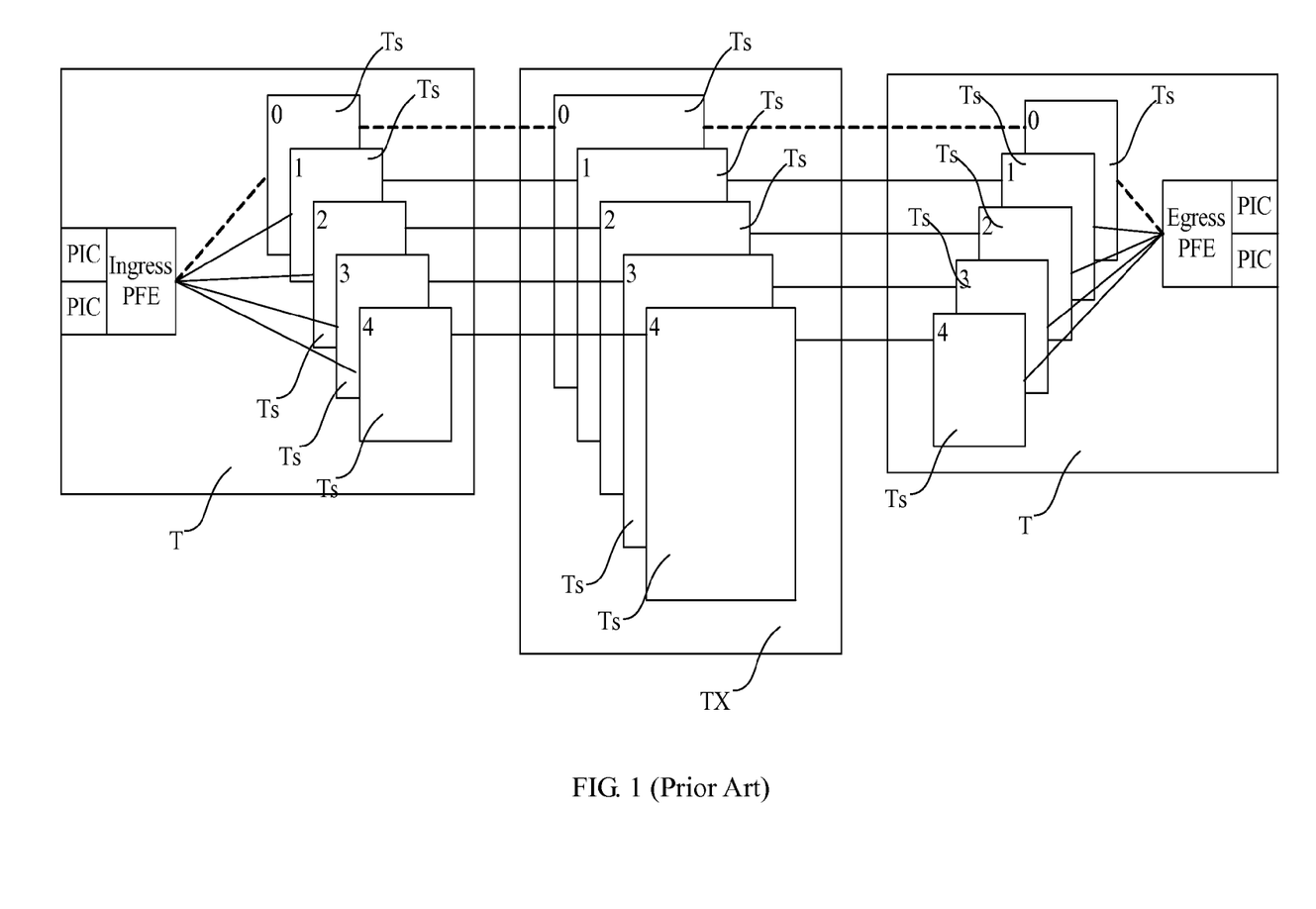
FIG. 1 shows a structure of a router cluster in a prior art.

FIG. 1 shows a first solution in the prior art which includes four T line processing chassis (routing nodes). Each T line processing chassis has five independent Ts switch fabric units, numbered from 0 to 4. The TX switching chassis (TX-Matrix platform) also includes five independent Ts switch fabric units, numbered from 0 to 4. The Ts units are connected on a one-to-one basis to compose five independent switching planes. Each switching plane is distributed in one TX switching chassis and four T line processing chassis. It should be noted that FIG. 1 only shows two T chassis and the other two T chassis are connected to the TX switching chassis in the same way as the shown two T line processing chassis are connected to the TX chassis. An external network is connected to the Ingress Packet Forwarding Engine (Ingress PFE) via a Physical Interface Card (PIC) and packets therefrom are distributed to different switching planes by information sources after being processed by the Ingress PFE.

During the process of implementing the present invention, the inventor finds that the above solution does not provide good scalability in practice. In particular, each stage-2 Ts switch fabric unit in the TX switching chassis has only four interfaces and therefore can only be cascaded with four T line processing chassis. To connect more T chassis, the entire TX chassis needs to be replaced. In addition, because the above router cluster includes only one TX switching chassis, once the TX chassis fails, data services on the four T line processing chassis in connection with the TX chassis will all be interrupted. Therefore, the reliability of the router cluster is low.

Figure 2:
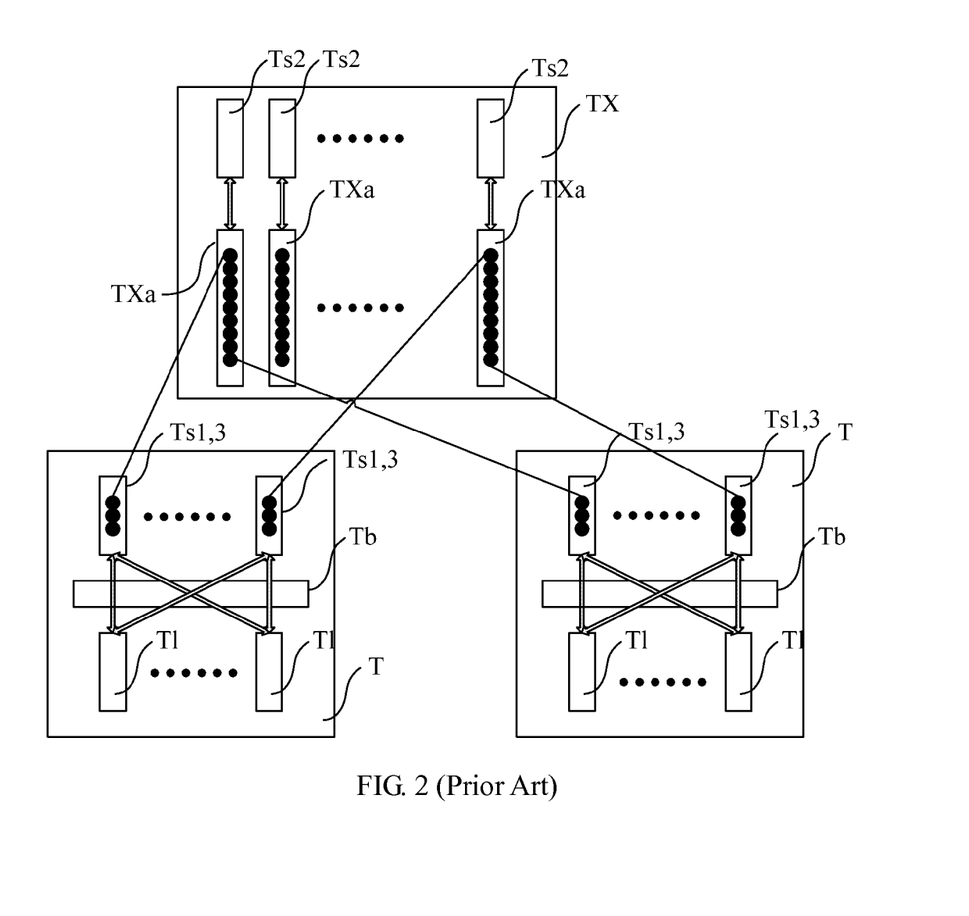
FIG. 2 shows a structure of another router cluster in a prior art.

FIG. 2 shows the structure of a router cluster composed by means of multi-chassis cascade with 9 line processing chassis according to a second solution in the prior art. The router cluster includes eight switching planes which share loads evenly. Inside each switching chassis is a stage-3 switch fabric. Physically, the stage-1/3 switch fabric unit Ts1,3 of each switching plane is placed in the T line processing chassis and the stage-2 switch fabric unit Ts2 is placed in the central switching chassis TX. Between stage 1 and stage 2 and between stage 2 and stage 3, an inter-chassis cascade optical cable is connected. The T line processing chassis consists of a Ts2 switch fabric unit, a Tb electrical backplane and several T1 line processing units.

Unlike the first solution, the second solution includes a TXa optical cross-connect unit placed between Ts1,3 and Ts2 of each switching plane. The TXa unit rearranges the cascade fibers between TX and T and afterwards connects the fibers to the Ts2 in the TX switching chassis. With the TXa, fibers can be regrouped so that the TX can connect more T chassis without the need to replace the Ts2. Thus, the router cluster is upgraded.

In the second solution, each TXa unit corresponds to one stage-2 switch fabric unit Ts1,3. Each TXa has nine optical interfaces, each connecting one T line processing chassis. One TXa is bound with one Ts2 and can provide nine optical interfaces to implement switching between nine T line processing chassis. The entire 9-chassis cascade system needs eight such binding units.

Figure 3:
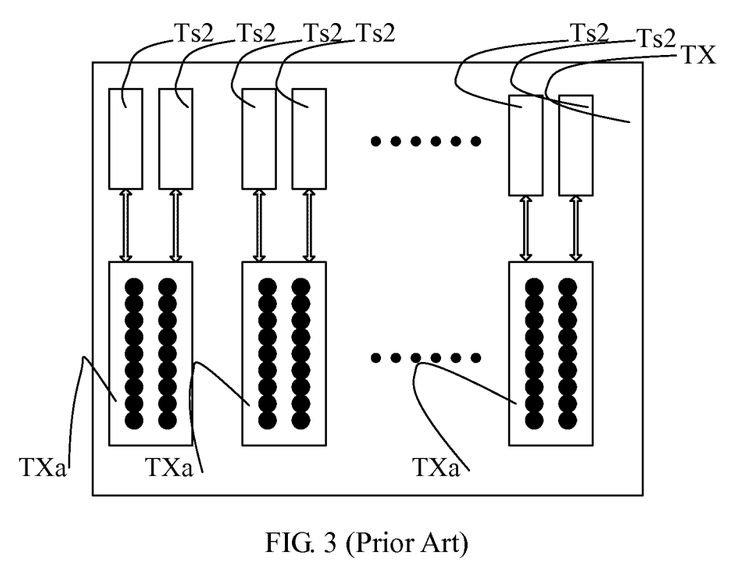
FIG. 3 shows an expanded structure of a switching chassis according to the prior art shown in FIG. 2.

As shown in FIG. 3, when the above router cluster is scaled up to a cascade of 18 T line processing chassis, the TXa that has nine optical interfaces in the TX switching chassis needs to be replaced by a TXa that has at least 18 optical interfaces and each 10-port TXa is bound respectively with two Ts2 switch fabric units to compose a binding unit. Each binding unit provides 18 optical interfaces and implements data switching between 18 T line processing chassis. The binding unit connects 18 T chassis in cascade in a same structure as shown in FIG. 2. The 18-chassis cascade system requires eight such binding units. In comparison with the 9-chassis cascade system, the switching capacity of each binding unit is doubled.

As described above, when it is necessary to further expand the capacity of the router cluster, the 18-port TXa needs to be replaced with a 36-port TXa and each TXa is bound respectively with four Ts2 units so as to implement data switching between the TX and 36 T line processing chassis.

Although the second solution allows capacity expansion of the router cluster, the optical cross-connect unit in the switching chassis needs to be replaced. Because the cost of an optical cross-connect unit is high, this will result in the waste of user investment.

SUMMARY OF THE INVENTION

Embodiments of the present invention provide a switching chassis, where any cascade interface of any cascade unit is connected to one switching port of any switching unit, so that the capacity of a router cluster can be expanded without the need to replace any switching chassis component.

Embodiments of the present invention also provide a router cluster, which includes switching chassis of the above structure and may be scaled up without replacing any switching chassis component at a lower cost.

A switching chassis includes more than one cascade unit and more than one switching unit, where: the cascade units have cascade interfaces to connect line processing chassis; the switching units have switching ports to connect the cascade interfaces; and any cascade interface of any cascade unit is connected to one switching port of any switching unit.

In the above switching chassis, each cascade interface of any cascade unit is connected to all the switching units and each switching unit is connected to all cascade interfaces. With such a structure, a switching unit implements any switching between multiple cascade interfaces. This provides a technical condition for expanding the capacity of a router cluster without replacing any of its components and helps to reduce the expansion cost.

A router cluster includes switching chassis and line processing chassis interconnected via optical fibers, where: one switching chassis includes more than one cascade units and more than one switching unit; the cascade units have cascade interfaces to connect the line processing chassis and any optical interface of any line processing chassis is uniquely connected to one cascade interface of any cascade unit; and the switching units have switching ports to connect the cascade interfaces and any cascade interface of any cascade unit is connected to one switching port of any switching unit.

The router cluster is built on the basis of the switching chassis provided by the present invention. In addition, through the addition of new switching chassis and the change of the connection map between all switching chassis and all line processing chassis, the router cluster is able to implement any switching between N, 2N, 4N, . . . , or M×N line processing chassis, where N and M are both a power of 2, or $N=2^i$ and $M=2^j$ where i and j are 0 or an integer above 0. Therefore, to expand the capacity of the router cluster, it is only necessary to add new switching chassis and line processing chassis without the need to replace any existing component so that the expansion cost is lower.

In addition, it is convenient for the switching chassis provided by the embodiments of the present invention to work with other switching chassis of the same type to compose a router cluster. Even when one of the switching chassis fails, other functioning switching chassis will continue working so that the connected line processing chassis can forward data packets normally and that data services will not be interrupted. The solution in the embodiments of the present invention is obviously superior to the technical solutions in the prior art.

DETAILED DESCRIPTION OF THE INVENTION

Figure 4:
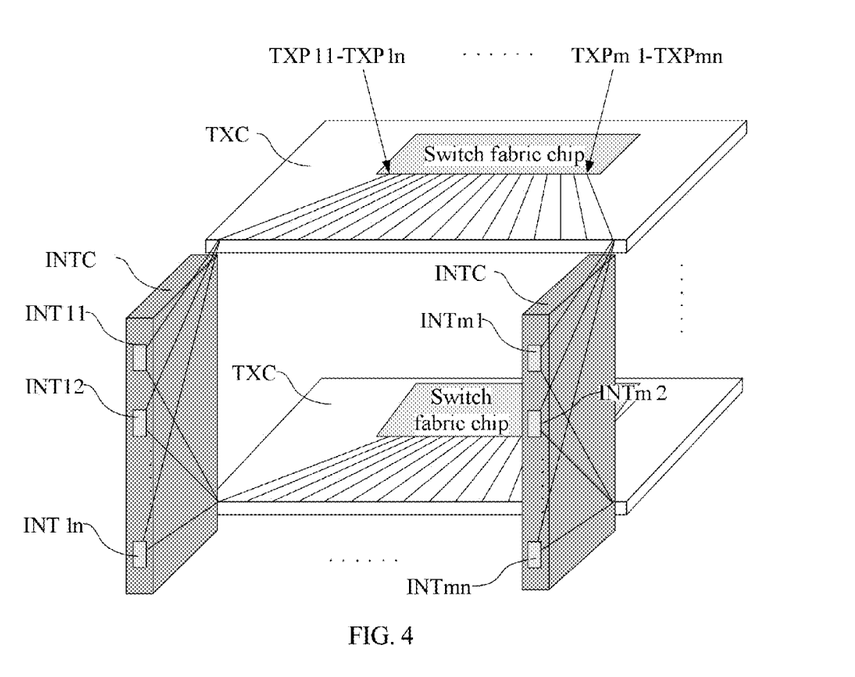
FIG. 4 shows a structure according to a first embodiment of the present invention.

FIG. 4 shows a structure according to the first embodiment of the present invention. As shown in FIG. 4, a TX switching chassis according to the first embodiment of the present invention includes P TXC switching units, where p is a positive integer; each TXC has m×n switching ports and the TX chassis further includes m INTC cascade units, where m and n are also positive integers. Each INTC has n INT cascade interfaces and each INT has p channels accordingly. In fact, each TXC includes switch fabric chips and all switch fabric chips of one TXC provide m×n switching ports. Therefore, each TXC has m×n TXP switching ports. In the embodiment of the present invention, one TX chassis may have m×n INT cascade interfaces. Any INT is connected to one TXP of any switch fabric chip. In particular, any INT of any INTC is connected to a TXP of any TXC.

Suppose, in the embodiment of the present invention, the TX chassis has two INTC units, each INTC providing two INTs, and two TXC units, each providing 2×2 TXP ports. Arrange the TXPs of each TXC unit into 2-TXP groups and the connection between INTs and TXPs may be in the following modes:

In the first mode, the first INT of the first INTC is connected respectively to the first TXP in the first TXP group of all TXCs and the second INT of the first INTC is connected respectively to the second TXP in the first TXP group of all TXCs; the first INT of the second INTC is connected respectively to the first TXP in the second TXP group of all TXCs and the second INT of the second INTC is connected respectively to the second TXP in the second TXP group of all TXCs. The connection is an orthogonal connection, where all INTs of all INTCs are connected to the TXP of the TXC orthogonally mapped to the INTCs.

In the second mode, the first INT of the first INTC is connected to the first TXP of all TXCs. The connection is not orthogonal but meets the condition that the first INT of the first INTC is respectively connected to one TXP of any TXC. For example, the first INT of the first INTC is connected to the second TXP of the first TXP group of the first TXC and to the first TXP of the second TXP group of the second TXC. The second INT of the first INTC is connected to the first TXP of all TXCs. The connection is not orthogonal but meets the condition that the second INT of the first INTC is respectively connected to one TXP of any TXC that is not connected with the first INT of the first INTC. For example, the second INT of the first INTC is connected to the first TXP of the first TXP group of the first TXC and to the second TXP of the second TXP group of the second TXC.

In the second mode, when the number of TXCs and INTCs in the TX chassis grows, the variations will also increase. Whatever the variations are, the condition that any INT of any INTC is connected to one TXP of any TXC needs to be met.

Normally, the number of INTCs and the number of TXCs are both positive integers. In practice, the number of INTCs and the number of TXCs may also be set to a power of 2. This will facilitate the orthogonal connection between INTCs and TXCs in the TX chassis.

It should be noted that the switch fabric chips on a TXC in the TX chassis decides the number of TXPs of the TXC. Particularly, the number of TXPs provided by all switch fabric chips of the TXC is the number of TXPs provided by the entire TXC.

To further explain the general embodiment, a more specific embodiment of the present invention will be described taking an orthogonal connection as an example. In the embodiment, the TX chassis includes P switch fabric units (or TXC) and M line processing units (or INTC), where each TXC has M×N TXPs and each INTC has N INTs. M and N are both a power of 2 (1, 2, 4, 8, 16, 32, ... ) and P is a positive integer. The INTC is connected to a line processing chassis and the TXC implements data switching between INTs. For the purpose of switching, in the TX chassis, each TXC is interconnected with each INTC. Switching fabric chips are configured on each TXC. In the embodiment, the number of switch fabric chips on each TXC is 1. However, in the case of some large-capacity TXCs, multiple switch fabric chips may be configured to compose a switch fabric array.

As described above, each switch fabric chip has M×N TXPs. The TX chassis has P TXCs and each TXC provides M×N TXPs. Therefore, the TX chassis has altogether M×N INTs. The M×N INTs are connected to the M×N TXPs of each of the P switch fabric chips on a one-to-one basis. When N INTCs need to be interconnected in the TX chassis, the connection map between the TXCs and INTCs is described in Table 1.

TABLE 1

| INTC | INT | TXP |
|------|-----|-----|
| 1    | 11  | 11  |
| 1    | 12  | 12  |
| ...  | ... | ... |
| 1    | 1M  | 1M  |
| ...  | ... | ... |
| N    | 1   | N1  |
| N    | 2   | N2  |
| ...  | ... | ... |
| N    | M   | NM  |

In Table 1, the numerals and symbols under INTC stand for the number of each INTC; the numerals and symbols under INT stand for the number of each INT; and the numerals and symbols under TXP stand for the number of each TXP of each TXC. In Table 1, each row describes a connection map between the specified INT of the specified INTC and specified TXP of the appropriate TXC. Suppose the TX chassis has P TXCs. After the connections described in Table 1 are complete, the TX chassis will provide P switching planes. Each TXC in the TX chassis is connected to the N INTCs.

Figure 5:
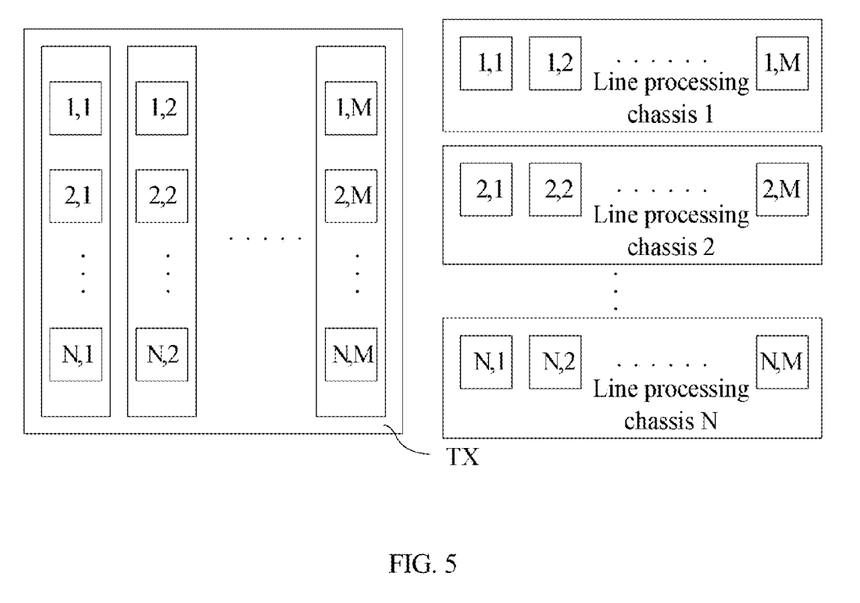
FIG. 5 shows a connection map of a router cluster according to a second embodiment of the present invention.

Based on the above TX chassis, the optical interfaces of N line processing chassis are connected to the corresponding INTs of N INTCs so as to connect the N line processing chassis to the P TXCs in the TX chassis and compose a complete router cluster. FIG. 5 shows a connection map between N×M INTs in the TX chassis and N line processing chassis according to the second embodiment of the present invention. The N×M INTs in the TX chassis are connected to correspondingly numbered optical interfaces in the N line processing chassis.

As described above, no matter whether the TXCs and INTCs within the TX chassis are in orthogonal or non-orthogonal connection, the connection map shown in FIG. 5 can be adopted to create a router cluster so long as the connection in the TX chassis meets the condition in the forgoing embodiments of the TX chassis.

Figure 6:
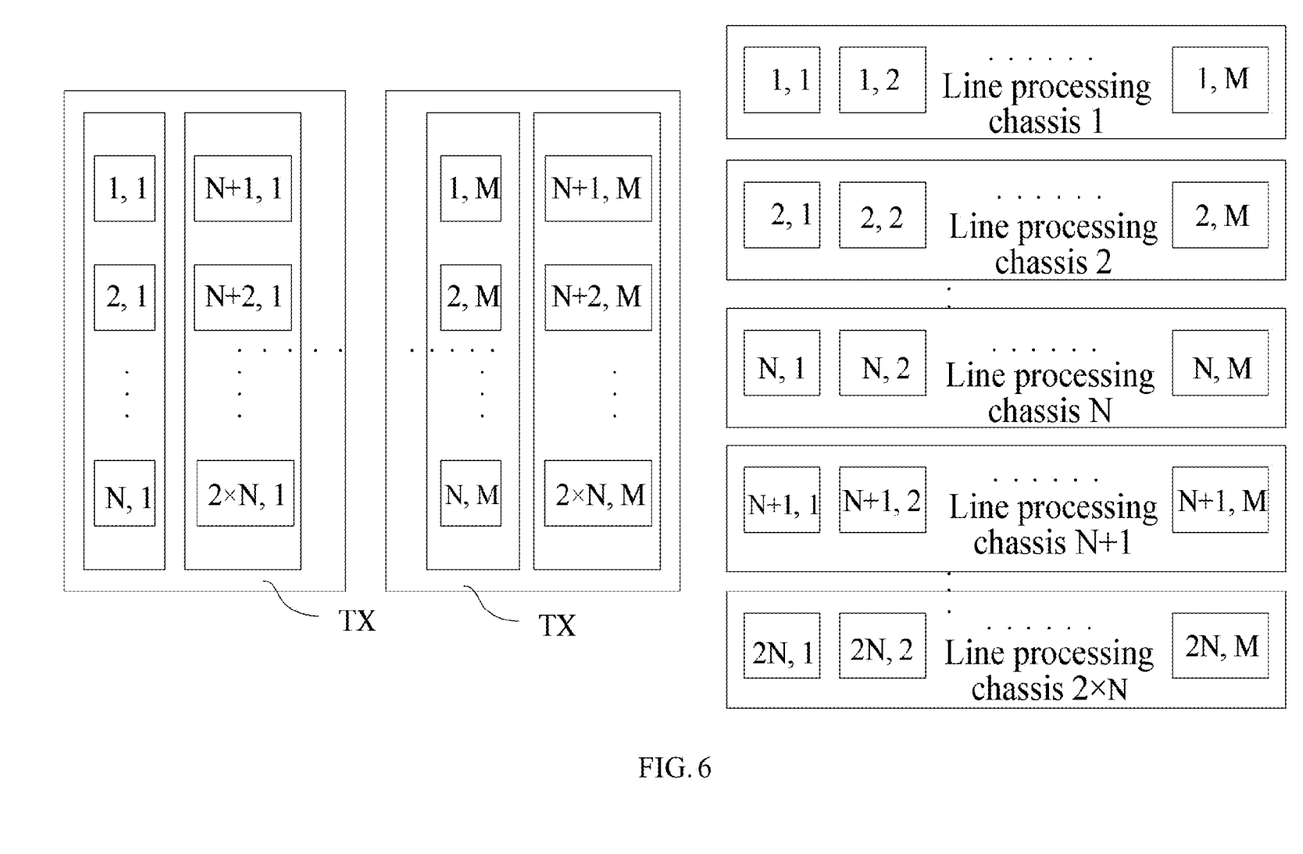
FIG. 6 shows a connection map of a router cluster expanded on the basis of FIG. 5.

As shown in FIG. 6, another embodiment based on the foregoing TX chassis is like this: when it is necessary to scale up the above router cluster, for example, to double its capacity, two TX chassis in the foregoing embodiments may be connected to 2N line processing chassis. The specific connection is as follows:

For description purposes, the two TX chassis are described as the first TX chassis and the second TX chassis. Both the first TX chassis and the second TX chassis have odd and even switching planes.

Among the N old line processing chassis, chassis previously connected to the even switching planes of the first TX chassis are reconnected to the odd planes of the second TX chassis. The N new line processing chassis are respectively connected to the even planes of the first TX chassis and the second TX chassis. Thus, the router cluster is expanded to double its original capacity.

The foregoing embodiment describes only one connection mode for capacity expansion. Optionally, if those of the N old line processing chassis connected to the even planes of the first TX chassis are reconnected to the even planes of the second TX chassis, half of the N new line processing chassis may be connected to the even planes of the first TX chassis and the other half are connected to the odd planes of the second TX chassis.

In addition, the capacity can be expanded so long as the new line processing chassis are connected to the first TX chassis and the old line processing chassis are connected to the second TX chassis.

Figure 7:
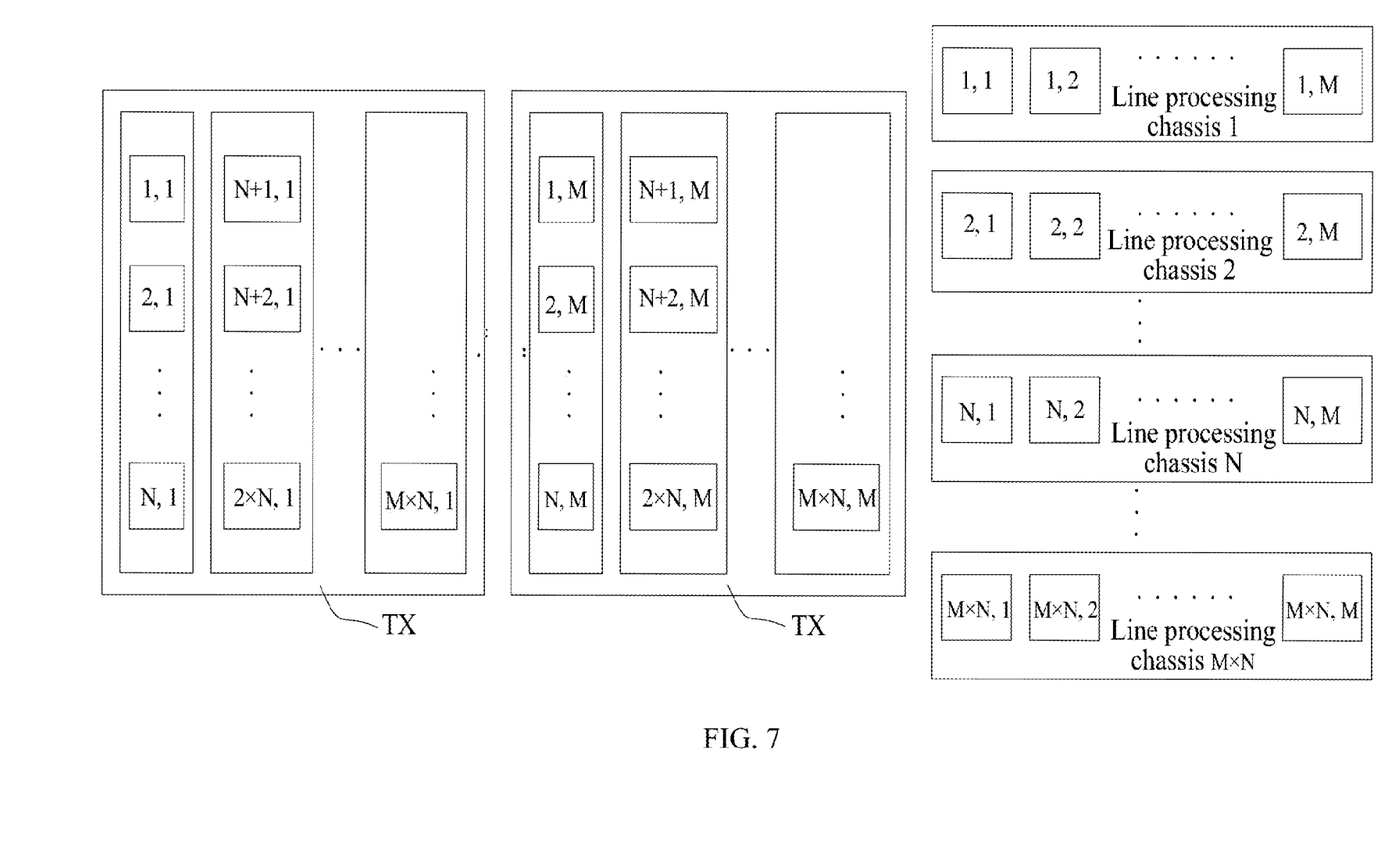
FIG. 7 shows another connection map of a router cluster expanded on the basis of FIG. 5.

In practice, according to the above method, up to N×M line processing chassis can be connected in cascade. When N×M line processing chassis are connected in cascade, the cascade system will include M TX chassis and N×M line processing chassis. Each of the M×N TXPs of the TX chassis is respectively connected to a corresponding optical interface on each of the N×M line processing chassis. FIG. 7 shows an exemplary cascade connection of N×M line processing chassis. The mapping of connections is the same as that in the above embodiment and omitted here.

Finally, although the technical solution of the present invention has been described through exemplary embodiments, the present invention is not limited to such embodiments. It is apparent that those skilled in the art can make various modifications and variations to the present invention without departing from the spirit and scope of the present invention. The invention is intended to cover the modifications and variations provided that they fall in the scope of protection defined by the claims or their equivalents.

What is claimed is:

1. A switching chassis, comprising a plurality of cascade units and a plurality of switching units, wherein:
   each of the plurality of cascade units has a plurality of cascade interfaces connecting to a plurality of line processing chassis, wherein the switching chassis and the line processing chassis are physically separate;
   each line processing chassis has a plurality of optical interfaces;
   each optical interface of each line processing chassis connects to only one cascade interface of one cascade unit and each cascade interface of each cascade unit connects to only one optical interface of one line processing chassis;
   each of the plurality of switching units has a plurality of switching ports connecting to the plurality of the cascade interfaces; and
   each cascade interface of each cascade unit connects to one switching port of each of the plurality of the switching units,
   wherein each switching port is only connected to one cascade interface, wherein the number of the plurality of cascade units is M, which equals 2j, where j is an integer greater than 0, and wherein each of the plurality of switching units has M×N switching ports, where N equals 2i and i is an integer greater than 0.

2. The switching chassis of claim 1, wherein each cascade interface of each cascade unit connects to one switching port of each of the plurality of the switching units in orthogonal mode.

3. The switching chassis of claim 1, wherein each of the plurality of cascade units has N cascade interfaces.

4. A router cluster, comprising a switching chassis and a plurality of line processing chassis that are interconnected via optical fibers, wherein:

the switching chassis comprises a plurality of cascade units and a plurality of switching units;

each of the plurality of cascade units has a plurality of cascade interfaces connecting to the plurality of line processing chassis, wherein the switching chassis and the line processing chassis are physically separate;

each line processing chassis has a plurality of optical interfaces;

each optical interface of each line processing chassis connects to only one cascade interface of one cascade unit and each cascade interface of each cascade unit connects to only one optical interface of one line processing chassis;

each of the plurality of switching units has a plurality of switching ports connecting to the plurality of the cascade interfaces; and each cascade interface of each cascade unit connects to one switching port of each of the plurality of the switching units, wherein each switching port is only connected to one cascade interface, wherein the number of the plurality of cascade units is M, which equals 2j, where j is an integer greater than 0, and wherein each of the plurality of switching units has M×N switching ports, where N equals 2i and i is an integer greater than 0.

5. The router cluster of claim 4, wherein each cascade interface of each cascade unit connects to one switching port of each of the plurality of the switching units in orthogonal mode.

6. The router cluster of claim 5, wherein each of the plurality of cascade units has N cascade interfaces, where N equals 2i and i is an integer above 0.

7. A switching chassis, comprising a plurality of cascade units and a plurality of switching units, wherein:

each of the plurality of cascade units has a plurality of cascade interfaces connecting to a plurality of line processing chassis, wherein the switching chassis and the line processing chassis are physically separate;

each of the plurality of switching units has a plurality of switching ports connecting to the plurality of the cascade interfaces; and each cascade interface of each cascade unit connects to one switching port of each of the plurality of the switching units, wherein each switching port is only connected to one cascade interface, wherein the number of the plurality of cascade units is M, which equals 2j, where j is an integer greater than 0, and wherein each of the plurality of switching units has M×N switching ports, where N equals 2i and i is an integer greater than 0.

8. The switching chassis of claim 7, wherein each cascade interface of each cascade unit connects to one switching port of each of the plurality of the switching units in orthogonal mode.

9. The switching chassis of claim 7, wherein each of the plurality of cascade units has N cascade interfaces, where N equals 2i and i is an integer above 0.

* * * * *